W. BEACH.
Corn Sheller.
No. 4,460. Patented April 18, 1846.
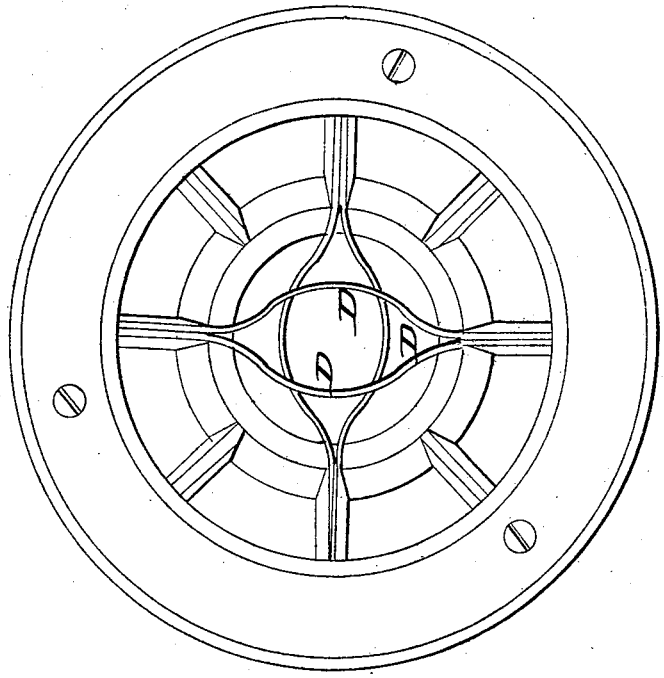
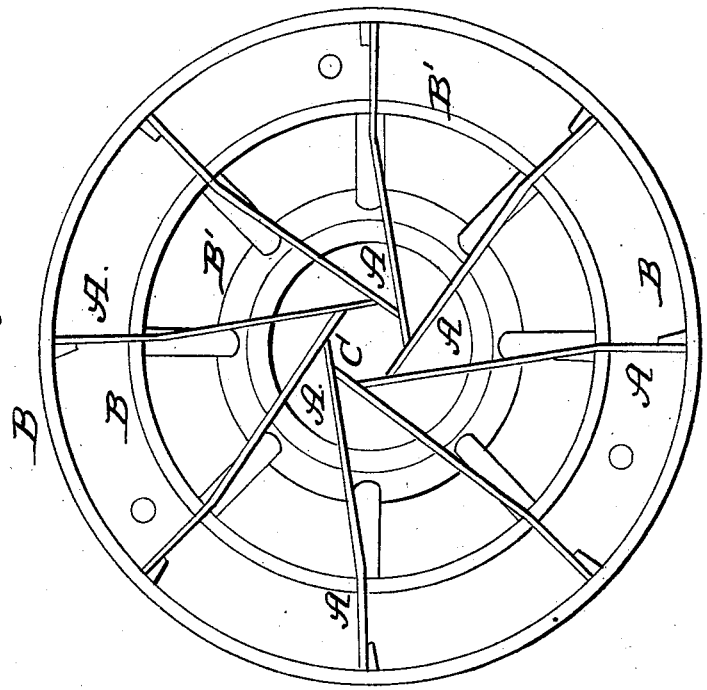

UNITED STATES PATENT OFFICE.

WALDREN BEACH, OF BALTIMORE, MARYLAND.

CORN-SHELLER.

Specification of Letters Patent No. 4,460, dated April 18, 1846.

*To all whom it may concern:*

Be it known that I, WALDREN BEACH, of the city of Baltimore and State of Maryland, have invented a new and useful Machine for Shelling Corn, which is described as follows, reference being had to the annexed drawings of the same, making part of this specification.

Figure 1 is a top view or plan of the machine, the circular cap being removed. Fig. 2 is another modification of the invention.

This machine consists of a series of straight springs A, that are to strip the corn from the cob, arranged on lines tangential to a circle corresponding in diameter with an ordinary size cob, having their outer ends secured in corresponding grooves made in the upper edges of two concentric rims B or rings, or circles, of a spider or open frame B′ through which the grain and cobs are to descend during the operation of shelling or stripping the corn from the cob—the central opening C formed by the union of the inner ends of the springs being that of a polygon of as many sides as there are springs; and through which central opening C the cob is driven by a wooden mallet, or other heavy article—the springs arresting the grains of corn and strippng them from the cob and these descending through the openings of the spider frame. When ears of corn of greater diameter are required to be shelled the same process is pursued—the springs A yielding outward and accommodating themselves to the increased sizes of the ears, or cobs, to be forced through the polygonal opening. There may be any required number of springs arranged in a similar or other substantially similar mode. The elastic stripping bars or springs, however, may be arranged in various ways. They may be arranged in the manner represented in Fig. 2 which resembles two elliptic springs D crossed at right angles having their outer ends secured in the same manner as the straight springs in the concentric rings of a circular spider frame.

What I claim as my invention and desire to secure by Letters Patent is—

The arrangement of the elastic stripping bars in combination with the open frame forming the apparatus or machine for shelling corn in the manner described, whether the spring bars be arranged in the manner above described, or any other mode substantially the same.

WALDREN BEACH.

Witnesses:
ALBERT E. H. JOHNSON,
WM. TRAPP, Jr.